United States Patent
Rozmarynowski et al.

(10) Patent No.: US 9,937,579 B2
(45) Date of Patent: Apr. 10, 2018

(54) INTEGRATED CABLE MANAGEMENT FOR WELDING AND CUTTING SYSTEMS

(71) Applicant: Hobart Brothers Company, Troy, OH (US)

(72) Inventors: Scott Ryan Rozmarynowski, Greenville, WI (US); Brian Scott Bashore, Tipp City, OH (US)

(73) Assignee: HOBART BROTHERS COMPANY, Troy, OH (US)

( * ) Notice: Subject to any disclaimer, the term of this patent is extended or adjusted under 35 U.S.C. 154(b) by 237 days.

(21) Appl. No.: 13/943,353

(22) Filed: Jul. 16, 2013

(65) Prior Publication Data

US 2015/0021306 A1    Jan. 22, 2015

(51) Int. Cl.
| | |
|---|---|
| *B23K 9/10* | (2006.01) |
| *B23K 9/173* | (2006.01) |
| *B23K 9/29* | (2006.01) |
| *B23K 9/32* | (2006.01) |

(52) U.S. Cl.
CPC ............ *B23K 9/1043* (2013.01); *B23K 9/173* (2013.01); *B23K 9/293* (2013.01); *B23K 9/32* (2013.01)

(58) Field of Classification Search
CPC ........ B23K 9/1043; B23K 9/32; B23K 9/293; B23K 9/173
USPC .......... 219/130.1, 137 R, 136; 385/134, 135; 339/29 B, 119 C, 147 C, 28, 29 R, 159 A
See application file for complete search history.

(56) References Cited

U.S. PATENT DOCUMENTS

| | | | | |
|---|---|---|---|---|
| 2,143,529 | A | * | 1/1939 | White ................ B26B 19/3833 206/351 |
| 4,647,139 | A | * | 3/1987 | Yang .................. B60R 16/0207 439/483 |
| D427,048 | S | * | 6/2000 | Potter ............................ D8/356 |
| D648,685 | S | * | 11/2011 | Symons ....................... D13/155 |
| 2003/0010519 | A1 | * | 1/2003 | Pieck ................... G02B 6/4428 174/659 |
| 2005/0258155 | A1 | | 11/2005 | DeYoung |
| 2007/0039912 | A1 | * | 2/2007 | Hinkens ................. B65H 75/06 211/71.01 |
| 2008/0120847 | A1 | | 5/2008 | Alliss |
| 2010/0084387 | A1 | | 4/2010 | Bender |
| 2010/0111481 | A1 | * | 5/2010 | Burek .................. G02B 6/4471 385/135 |
| 2011/0095009 | A1 | * | 4/2011 | Kindig ..................... B23K 9/10 219/130.1 |
| 2011/0240612 | A1 | | 10/2011 | Maeno |
| 2011/0284513 | A1 | * | 11/2011 | Rappl .................. B23K 9/0008 219/130.1 |

* cited by examiner

*Primary Examiner* — Phuong Nguyen
(74) *Attorney, Agent, or Firm* — McAndrews, Held & Malloy, Ltd.

(57) ABSTRACT

A power supply for use in a welding or cutting system includes a housing configured to hold circuitry of the power supply. The housing includes clips at one or more corners of the housing. The clips are configured to receive and hold a cable when the cable is wrapped around the housing. The cable is coupled to and extending from the power supply.

16 Claims, 6 Drawing Sheets

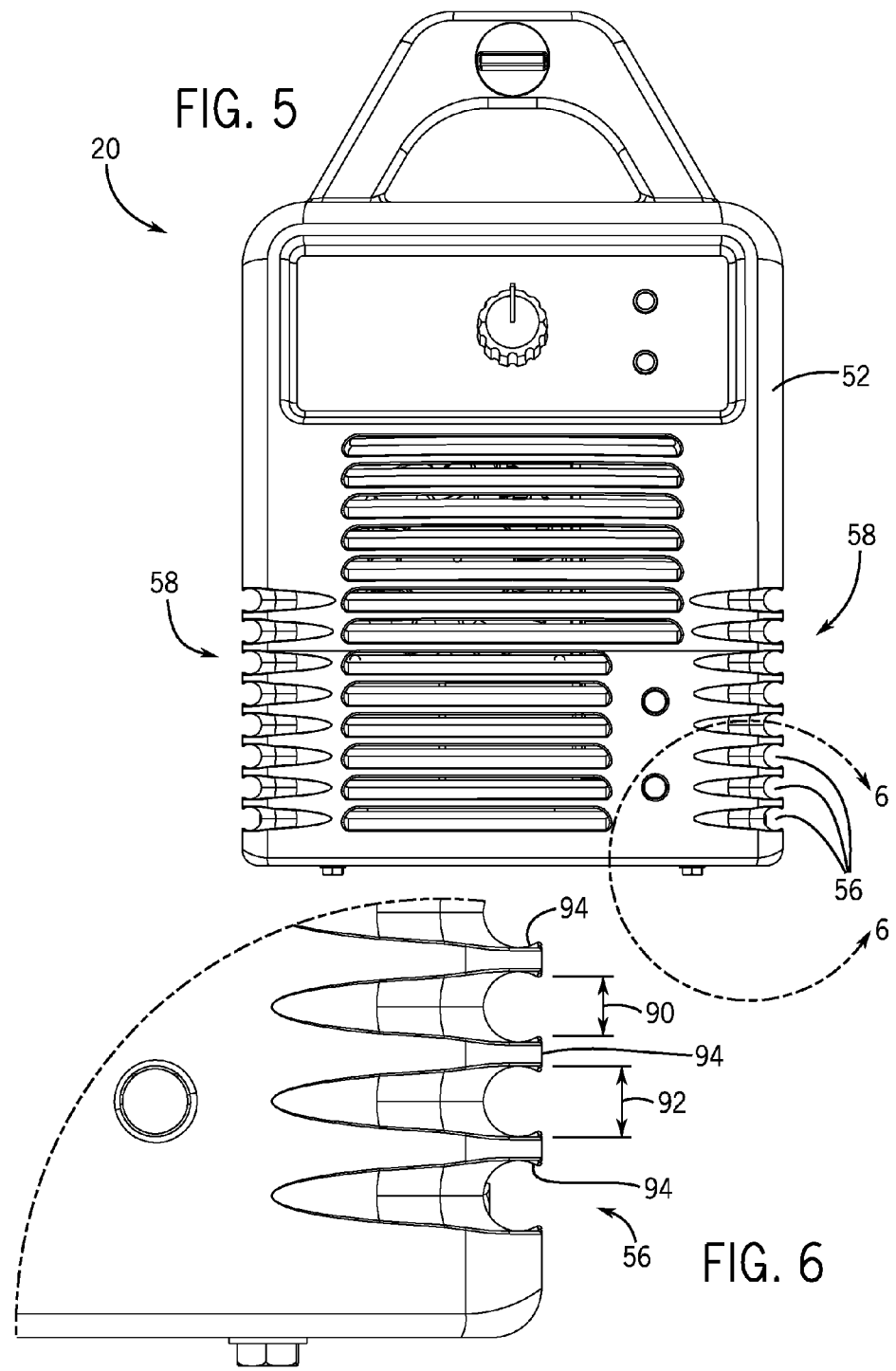

INTEGRATED CABLE MANAGEMENT FOR WELDING AND CUTTING SYSTEMS

BACKGROUND

The invention relates generally to welding and cutting systems and, more particularly, to systems and methods for providing integrated cable management in welding and cutting systems.

Welding and cutting processes have increasingly become utilized in various industries and applications. Welding and cutting processes may include, but are not limited to, processes such as: gas metal arc welding (GMAW), shielded metal arc welding (SMAW), flux cored arc welding (FCAW/FCAW-S), submerged arc welding (SAW), gas tungsten arc welding (GTAW), carbon arc gouging (CAW), plasma arc welding (PAW), and plasma cutting. Such processes may be automated in certain contexts, although a large number of applications continue to exist for manual welding and cutting operations. Such manual operations rely on a variety of types of equipment, including various cables for carrying electrical current between a power supply, a workpiece, and a handheld torch.

In various industries, welding and cutting processes may be performed using machines that are transportable to and from a worksite. Various cable management systems may be utilized with portable welders and plasma cutters to enable relatively easy transportation of the machines and their associated cables. Existing cable management systems have several disadvantages. For example, some welding or cutting machines utilize straps to secure the cables together. However, these secured cables still are not maintained in a relatively stationary position relative to the portable machine as it is carried from place to place. Other portable welders and cutters include sheet metal brackets or hangers located along a front panel of the machine so that the cables may be wrapped around these. However, the cables may slip off of the hanger if they are not wound tightly and, in some instances, there may be no way to secure the clamp or torch located at the end of the cables. Still other portable welding and cutting machines include pouches, such as an accessory bag that hangs over a side of the machine or a machine cover with pockets. These pouches are separate from the physical machine itself and may require an undesirable amount of time and energy to attach to, or position over, the machine. In addition, such pouches may not be fully secured to the machine, so that the pouch jostles during transportation of the machine. Accordingly, it is now recognized that there exists a need for improved cable management systems that are integrated with the welding or cutting machine.

BRIEF DESCRIPTION

Present embodiments are designed to respond to such a need. In accordance with a first embodiment, a power supply for use in a welding or cutting system includes a housing configured to hold circuitry of the power supply. The housing includes clips at one or more corners of the housing. The clips are configured to receive and hold a cable when the cable is wrapped around the housing. The cable is coupled to and extending from the power supply.

In another embodiment, welding or cutting system includes a power supply and a cable assembly. The power supply includes a housing having clips at one or more outside edges of the housing. The cable assembly includes a clamp or a torch disposed adjacent a distal portion of a cable. The distal portion of the cable is configured for attachment to another portion of the cable or to the power supply when the cable is wrapped around the power supply via the clips.

In a further embodiment, a method for managing cables in a welding or cutting system is provided. The method includes maintaining, via clips of a housing of a power supply, a cable wrapped about the power supply. The method also includes securing a torch or clamp relative to the power supply, wherein the torch or clamp is disposed at a distal end of the cable.

DRAWINGS

These and other features, aspects, and advantages of the present invention will become better understood when the following detailed description is read with reference to the accompanying drawings in which like characters represent like parts throughout the drawings, wherein:

FIG. 5 is a front view of an embodiment of a power supply having cable management clips for receiving a cable;

FIG. 6 is a front view of an embodiment of the power supply of FIG. 5, taken within line 6-6, showing clips for receiving one size of cable;

DETAILED DESCRIPTION

Presently disclosed embodiments are directed to systems and methods for managing cable assemblies in welding and cutting systems. The cable assemblies may include a work cable assembly and a torch cable assembly, each extending from the same power supply. The work cable assembly includes a work cable, coupled to and extending from the power supply, and a work clamp disposed at a distal end of the work cable. The "distal" end or portion of the cable is the free end of the cable that is furthest away from the power supply housing when the cable is attached to the power supply. Similarly, the torch cable assembly includes a torch cable, coupled to and extending from the power supply, and a welding torch (e.g., electrode holder) or plasma cutting torch disposed at a distal end of the torch cable. The cable management systems described herein allow an operator to wrap the cables around the power supply and to hold them in place while moving the power supply from place to place. The operator can wrap the cables around the power supply while aligning the cables with clips, e.g., grooves, formed in an outer housing of the power supply. The clips are designed to receive and secure the cables therein as the cables are wrapped around the power supply. In this way, the operator only has to snap the cables into the clips as they wrap the cables. In some embodiments, the cable assemblies may be configured for attaching the free end of the cables (e.g., torch or clamp end) to the power supply, or to another portion of the cables. This other portion of the cables may include portions of the cables which have been wrapped around and secured to the power supply via the clips. This cable management system, integral with the power supply, may offer relatively easy management of the work cable and the torch cable, so that an operator does not have to balance the cables on top of the power supply while carrying it around. The clips and other features of the power supply are integral with the machine. Since the power supply may be initially constructed to include such features, the enhanced cable management may be relatively inexpensive to implement.

Figure 1:
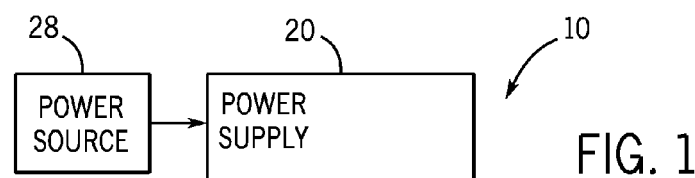
FIG. 1 is a diagrammatical representation of an embodiment of a welding system that may utilize a cable management system.

Turning now to the drawings, FIG. 1 is a diagrammatical representation of an embodiment of a welding/cutting system 10 that may utilize the disclosed cable management system. In the illustrated embodiment, the system 10 includes a shielded metal arc welding (SMAW) system used to produce an electric arc 12 for heating a workpiece 14 via a consumable welding electrode 16. The electrode 16, also referred to as a "stick electrode", may include a metal core wire with a flux coating of various materials. Power is supplied to the metal core wire to produce the arc 12, which heats the workpiece 14 and melts the wire into a weld puddle formed on the workpiece 14. The flux coating may provide an atmospheric shield of the weld area, reduce weld contaminants, direct and stabilize the arc 12, produce a weld bead with a desired chemical composition, and so forth. An operator may manipulate the electrode 16 in relation to the workpiece 14 via a torch 18, or more specifically, an electrode holder. A power supply 20 (e.g., a "welding machine") provides electricity through a work cable 22 and a torch cable 24 to produce the arc 12. For example, in some welding operations, the power supply 20 provides an electrical current through the work cable 22 to a clamp 26, which is removably coupled to the workpiece 14. The current arcs from the workpiece 14 to the electrode 16, and returns to the power supply 20 through the torch 18 and the torch cable 24. In some welding processes, the current may flow in the opposite direction.

A welding process (AC or DC) may be used to produce the desired weld, and the power supply 20 converts input power from a power source 28 to the desired power output. The power source 28 may represent the power grid, although other sources of power may also be used, such as power generated by an engine-driven generator, batteries, fuel cells, or other alternative sources. The power supply 20 includes circuitry 30, which may include power conversion circuitry, control circuitry, operator interface circuitry, and so forth. This circuitry 30 is configured to produce power that is suitable for welding.

In present embodiments, the power supply 20 may include an integrated cable management system. That is, certain built-in features of the power supply 20 may be used to secure the torch cable 24, the work cable 22, the torch 18, and the clamp 26 for relatively easy transportation of the system 10 when it is not in use. Such cable management features may be applied to portable plasma cutting systems as well. For example, in some embodiments, the power supply 20 may be a plasma torch power supply coupled to the torch 18, which may be a plasma torch. In such embodiments, the power source 28 may provide a current to the torch 18 for starting and generating a pilot arc, and for maintaining plasma and a cutting arc. For example, the power supply 20 may be configured to supply a suitable voltage and current to create an electrical circuit from the power supply 20, along the torch cable 24 to the torch 18, across a gap between the torch 18 and the workpiece 14 (e.g., as an electrical arc), through the workpiece 14 to the clamp 26, through the work cable 22 back to the power supply 20.

Other types of welding and cutting systems may make use of the presently disclosed cable management system. For example, the system 10 may include any desirable system (e.g., GMAW, GTAW, FCAW, SAW, CAW, etc.) that generates and maintains a current flowing between the power supply 20 and the workpiece 14 via the work cable 22, the torch cable 24, the torch 18, and the clamp 26. The work cable 22 and the torch cable 24 may be referred to collectively as cables 32 in the following discussion. The cable management features included in the power supply 20 may facilitate securing of the torch 18 and the clamp 26 to the power supply 20, as well as maintaining the cables 32 wrapped about the power supply 20.

Figure 2:
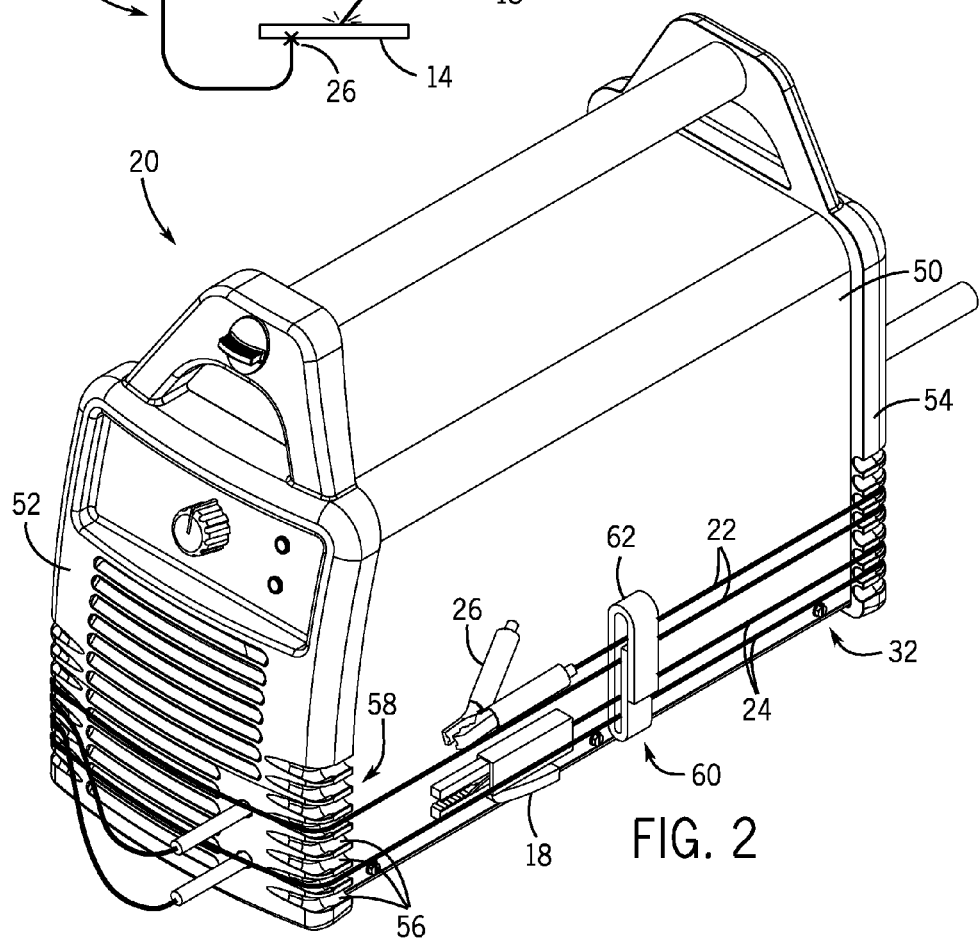
FIG. 2 is a perspective view of an embodiment of the welding system of FIG. 1 having cable management features.

FIG. 2 is a perspective view of an embodiment of the power supply 20 having certain cable management features. In the illustrated embodiment, the power supply 20 includes a housing 50 configured to hold the circuitry 30 of the power supply 20. The housing 50 includes a front panel 52 and a back panel 54 located on opposite ends of the power supply 20. In the illustrated embodiment, cable management features are built into each of the front panel 52 and the back panel 54. Specifically, the housing 50 includes clips 56 for receiving the cables 32 (i.e., the work cable 22 and the torch cable 24) as they are wrapped around the housing 50. Such clips 56 may be molded into the housing 50, specifically into the front panel 52 and the back panel 54 of the housing 50. In the illustrated embodiment, the clips 56 include grooves configured for receiving and holding the cables 32 in place around the power supply 20.

In the illustrated embodiment, the power supply 20 includes four sets 58 of the clips 56. Each set 58 include a certain number of clips 56, arranged in rows around each corner of the housing 50. The number of clips 56 in each set 58 may be different, depending on the number of times the cables 32 are to be wrapped around the power supply 20. This number may be determined based on the dimensions of the power supply 20 and the total length of each cable 32. As a result, the housing 50 may include an appropriate number of clips 56 for receiving a total length of the cables 32.

The corners of the power supply 20 may be slightly rounded to help guide the cables 32 around the power supply 20. The rounded corners may provide a smooth transition for the cables 32 from one side of the power supply 20 to another. This may help the cables 32 to not pop out of the clips 56 when an internal force of the cables 32 works to straighten the cables 32. In some embodiments, the corners may be rounded only along an inner portion of the clips 56, while the corners defining the outer edge of the power supply 20 may be relatively sharp. In other embodiments, the outer corners may be smoothly curved so that the clips 56 are formed to reach the same depth into the housing 50 along the arc of the corner. Other rounded corner arrangements may be possible as well.

Figure 3:
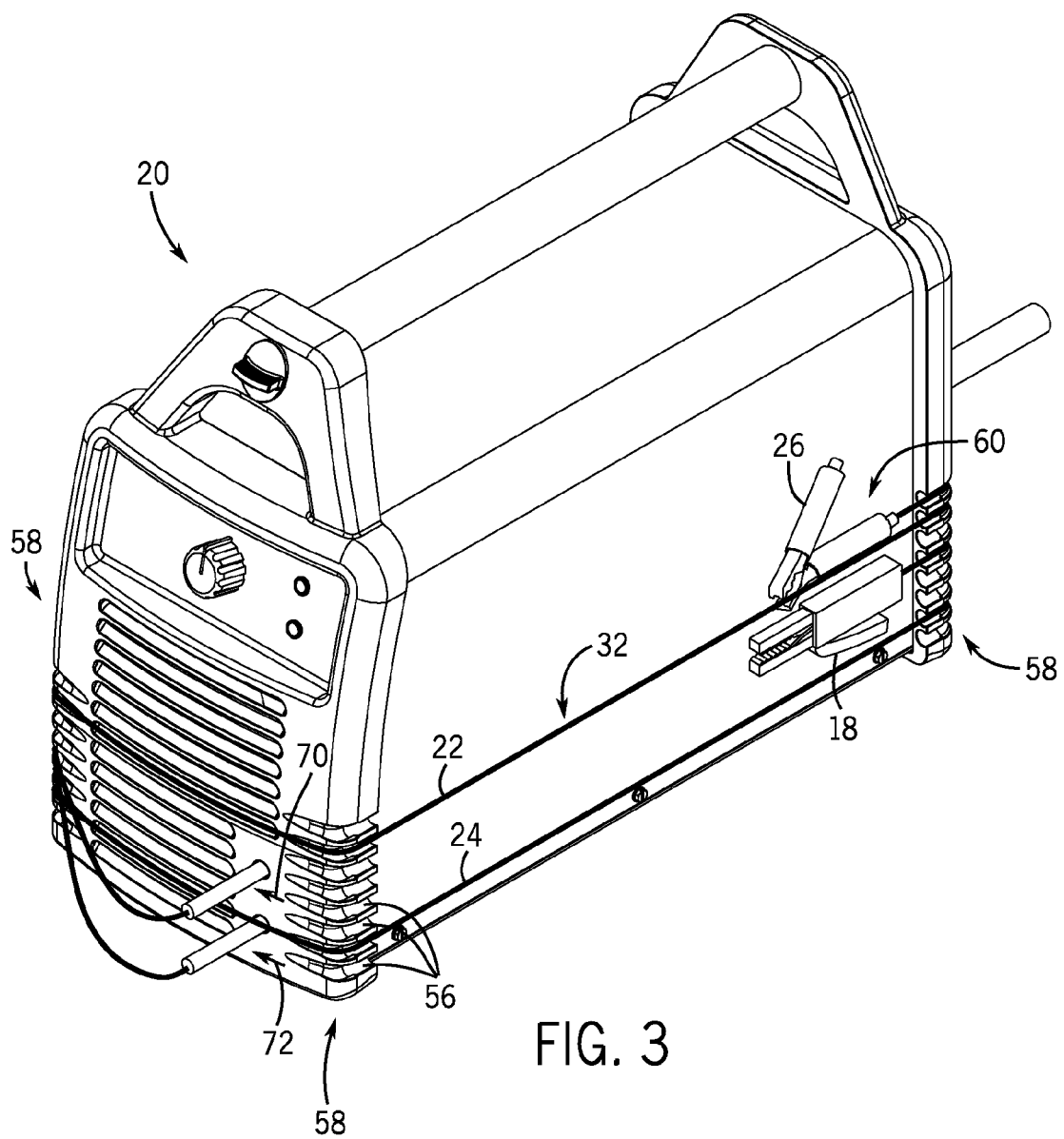
FIG. 3 is a perspective view of an embodiment of the welding system of FIG. 1 having cable management features.

In addition to the clips 56, the system 10 may include other cable management features. In some embodiments, for example, one or both of the cable assemblies may be configured for attaching the free ends of the cables 32 once the cables 32 are wrapped around the power supply 20. That is, a distal portion 60 of one or both of the cables 32 may be configured for attachment to another portion of the cables 32 or to the power supply 20. Examples of different types of attachment features used for this purpose are shown in FIGS. 2 and 3. This "distal portion" of the cable 32 is generally located proximate the torch 18 or the clamp 26, depending on the type of cable 32. That is, the distal portion is part of the cable 32 that is nearby, but separate from, the clamp 26 or the torch 18 located at the end of the cable.

In the embodiment illustrated in FIG. 2, a strap 62 (e.g., Velcro®) secures the distal portions 60 of the cables 32. The strap 62 may be part of, or coupled to, the distal portion 60 of one of the cables 32. The strap 62 may be able to support the weight of the clamp 26 and/or the torch 18 when it is wrapped around the cables 32 as shown. When wrapped around the cables 32 as illustrated, the strap 62 may secure the distal portions 60 of the cables 32 (along with the attached clamp 26 and torch 18) to other portions of the cables 32 that are wrapped around the housing 50.

Variations of the strap 62 and methods of securing the torch 18 and the clamp 26 via the strap 62 may be possible as well. For example, the cable assemblies may include two straps, one disposed at the free (e.g., distal) end of each of the cables 32 for securing the torch 18 and the clamp 26 to already wrapped portions of the cables 32. The strap 62 may be closed around any number of loops of the cables 32 already held in place by the clips 56. That is, the strap 62 may secure the attached torch 18 or clamp 26 via closure around one or more loops of the respective cable 32 held between two sets 58 of the clips 56.

As noted above, other methods for securing the torch 18 and the clamp 26 relative to the housing 50, or to the wrapped cables 32, may be possible. FIG. 3 is a perspective view of one such embodiment of the power supply 20. Instead of incorporating a strap (e.g., strap 62), the illustrated embodiment includes cables 32 that are appropriately sized for attachment of the cables 32 near their ends. Specifically, the length of the cables 32 allows the distal portion 60 of each cable 32 to be received into the clips 56 in the power supply 20. As shown, the clamp 26 and the torch 18 may be held substantially stationary relative to the power supply 20 via clips 56 included in one of the sets 58 of clips 56. In other embodiments, the distal portion 60 of the work cable 22 may be attached to the power supply 20 via a clip 56 in one set 58 of clips 56, while the distal portion 60 of the torch cable 24 may be attached via a clip 56 in another set 58.

It may be desirable for the cables 32 to be a certain length, so that when they are wrapped around the power supply 20, the distal portions 60 of the cables 32 align approximately with one or more sets 58 of clips 56. In some embodiments, the cables 32 may be designed to wrap around the power supply 20 in specific directions. For example, as illustrated, the cables 32 may be wrapped around the power supply 20 in the same direction. However, in other embodiments, the desired directions for each of the cables 32 may be opposite, depending on the length of the cables 32, the size of the power supply 20, the location of the clips 56, among other things. To indicate the correct direction for wrapping each of the cables 32, the power supply 20 may include visual indicators 70 and 72 (shown as arrows) displayed on the front panel 52 adjacent to where the respective cables 32 exit the housing 50. Such indicators 70 and 72 may include markings, indentations, LEDs, decals, and the like. The cables 32 may be wrapped around the power supply 20 with just enough length left over for attaching the distal portion 60 of each cable 32 proximate the clips 56.

Figure 4:
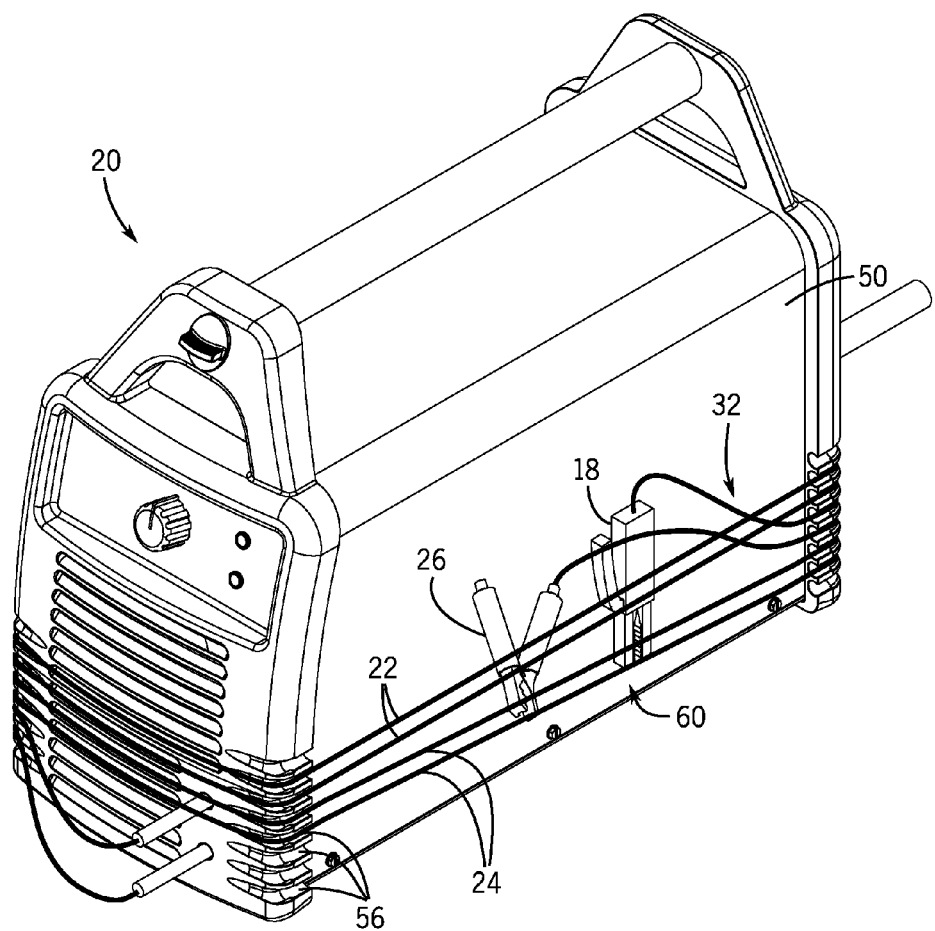
FIG. 4 is a perspective view of an embodiment of the welding system of FIG. 1 having cable management features.

FIG. 4 is a perspective view of another embodiment of the power supply 20. This embodiment shows that the clamp 26 and the torch 18 may be tucked behind or between the cables 32 that are wrapped around the power supply 20. As noted previously, the cables 32 may be held in place via the clips 56. More specifically, securing the torch 18 and the clamp 26 may involve holding the torch 18 and the clamp 26 between the housing 50 and a portion of the cables 32 wrapped around the housing 50. In some embodiments, the torch 18 and the clamp 26 may be positioned between different loops of the wrapped cables 32. In addition to those illustrated in FIGS. 2-4, other methods may be used to secure the torch 18 and the clamp 26 relative to the cables 32 and/or to the housing 50.

FIG. 5 is an embodiment of the power supply 20 having the clips 56 for receiving and holding the cables 32 around the power supply 20. This power supply 20 may be used with any of the cable assemblies detailed in FIGS. 2-4. Specifically, FIG. 5 illustrates the front panel 52 with two sets 58 of the clips 56, one set 58 extending along each corner of the front panel 52. As noted above, the cables 32 may be any desirable size (e.g., diameter) and length. In some embodiments, especially those having relatively larger sized cables 32, the length of the cables 32 may be up to approximately twenty feet in length. No matter the length of the cables 32, the power supply 20 may be equipped to receive and hold the entire length of the cables 32 within the clips 56. To that end, the power supply 20 may be constructed with a specific number of clips 56 in each set 58, this number of clips 56 corresponding to the total length of the cables 32, as well as the size of the housing 50 about which the cables 32 are wrapped. In the illustrated embodiment, each set 58 includes eight clips 56, allowing an operator to wrap each of the cables 32 around the power supply 20 four times. Power supplies 20 having different length cables 32 attached may include other numbers of clips 56 formed in the power supply 20. For example, it should be noted that cables 32 having a relatively larger length may have a relatively larger diameter, so the power supply 20 may need to have a larger number of relatively large diameter clips 56 to accommodate larger diameter cabling.

FIG. 6 is a close up view of the front panel 52 of FIG. 5, taken within line 6-6, showing the clips 56 in greater detail. The illustrated clips 56 are configured to not only receive and guide the cables 32 around the power supply 20, but to hold certain points of the cables 32 in place within the clips 56. This may reduce slackening in the cables 32 once they are situated in the clips 56. In addition, securing the cables 32 in this way may allow the torch 18 and the clamp 26 to be held proximate the clips 56 (e.g., FIG. 3) or between the stationary cables 32 and the housing 50 (e.g., FIG. 4). In order to grip the cables 32 in this way, the illustrated clips 56 include concave, generally semi-circular cavities (e.g., grooves) formed within the front panel 52. The cross section of the groove may change along the edge of the front panel 52, smoothly transitioning the cables 32 from a position resting against an outer edge of the front panel 52 to a seated position within the clips 56. Other substantially semi-circular groove arrangements may be used for gripping the cables 32 within the clips 56. The term "substantially semi-circular" is meant to represent grooves that are formed in the power supply 20 with a generally curved cross section. Although the illustrated embodiment shows semi-circular grooves, other embodiments may employ grooves with other cross sectional shapes.

In some embodiments, at the point (e.g., corner) where the cables 32 are seated within the clips 56, the clips 56 may include an opening 90 that is smaller than a diameter 92 of the semi-circular cross section of the groove. A flexible material may be used to form outer portions 94 of the clips 56, so that the cables 32 may be pushed into the clips 56. The flexible material may include, for example, vinyl, silicon rubber, or another relatively flexible material. In this way, the clips 56 may be flexible to aid insertion and removal of the cables 32. In addition, this flexible material may facilitate the insertion and removal of cables 32 having larger cable diameters than could otherwise be held in the clips 56. The clips 56 may be designed with the diameter 92 being approximately the same as, or slightly larger than, the diameter of one or both of the cables 32 received in the clips 56. In other embodiments, the clips 56 may be made of a non-flexible material, such as a thermoplastic (i.e., polycarbonate). The material may be the same material as the front and back panels 52 and 54 into which the clips 56 are formed.

In some embodiments, the diameter 92 may be chosen based on the rated output amperage of the power supply 20. That is, the diameter 92 may be matched to the diameter of cabling typically used to carry the desired output amperage of the particular power supply 20. However, some power supplies 20 may facilitate a wide range of amperage settings, so that two or more different sizes of cabling may be used to carry the output power. For example, a welding power supply 20 may be used with a #6 gauge weld cable in some configurations, and with a #4 gauge weld cable in other configurations. In GMAW welding systems, the MIG torch cable (i.e., weld cable) may be larger than the corresponding work clamp cable (i.e., work cable). To accommodate such different sizes of cabling, the power supply 20 may be equipped with two sets 58 of clips 56 at every corner, with each set 58 configured to receive cables 32 of different cable diameters.

Figure 7:
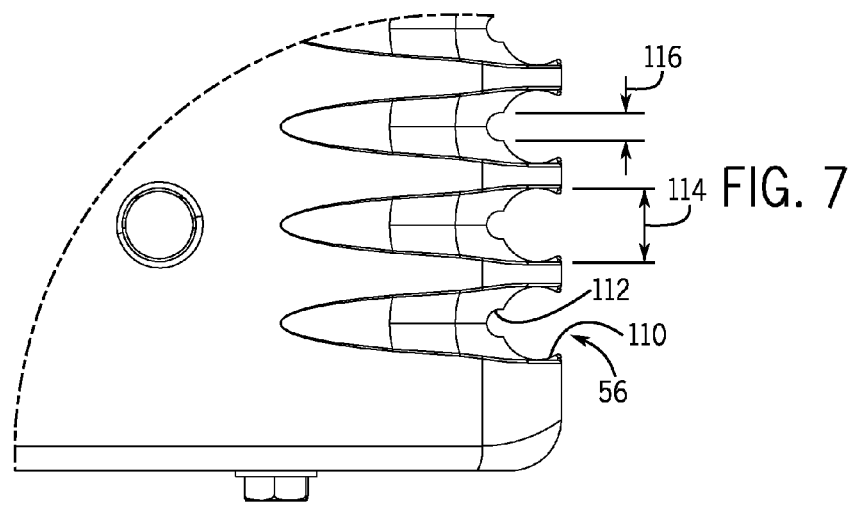
FIG. 7 is a front view of an embodiment of the power supply of FIG. 5, showing clips for receiving two sizes of cable.

In other embodiments of the power supply 20, the individual clips 56 may be designed to receive two or more sizes of cable. One such embodiment is illustrated in FIG. 7, where each clip 56 has an outer clip portion 110 and an inner clip portion 112. The outer clip portion 110 includes a semi-circular groove with a relatively large diameter 114 to receive larger diameter cables. The inner clip portion 112 includes a semi-circular groove with a relatively small diameter 116 to receive the smaller diameter cables. Other embodiments of the power supply 20 may be used to accommodate varying sizes of cable into the clips 56 for holding and securing the cables 32 within the power supply 20. In some embodiments, the cables 32 (weld cable and work cable) may both be disposed in the same nested clips 56. That is, the cables 32 may be positioned in both the inner clip portion 112 and the outer clip portion 110 of the same clip 56 at the same time.

Figure 8:
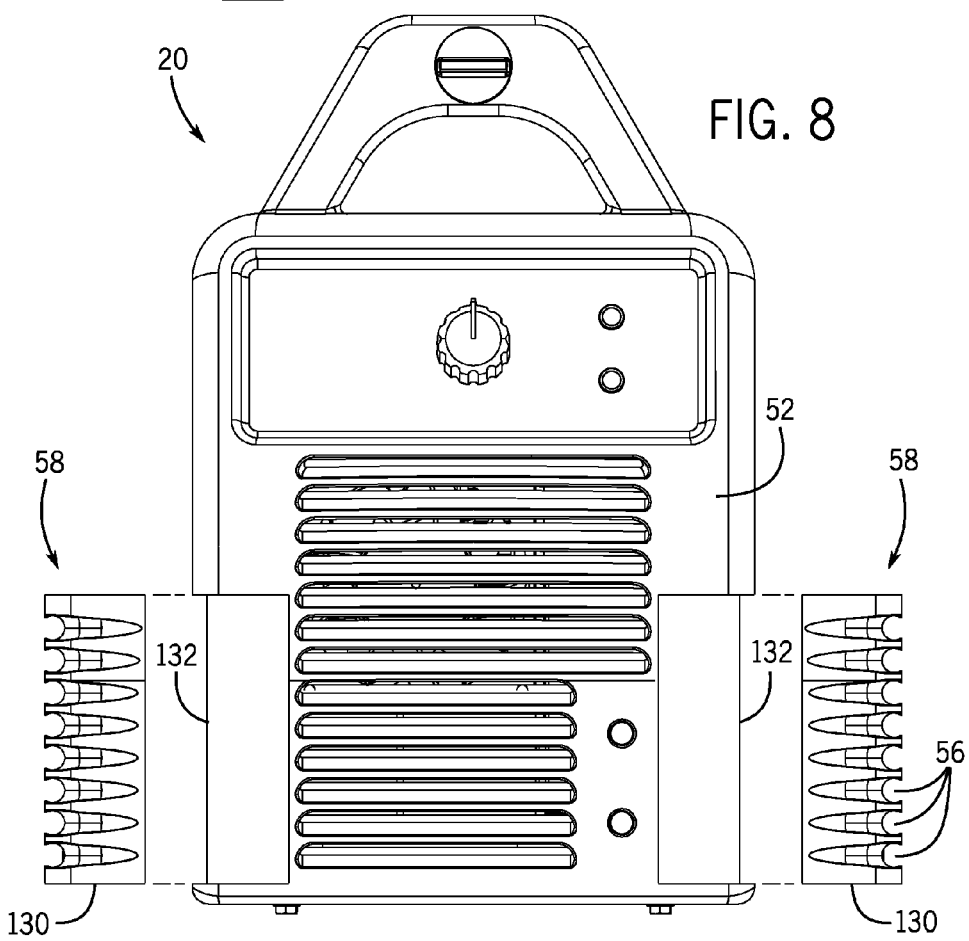
FIG. 8 is a front view of an embodiment of the power supply of FIG. 5 having removable cable management clips.

In some embodiments, the clips 56 may be removable from the power supply 20, as shown in FIG. 8. More specifically, each set 58 of clips 56 may be molded into a removable panel segment 130 of the power supply 20. The removable panel segments 130 may be inserted onto, and subsequently removed from, an inner panel 132 of the housing 50. Insertion of these panels 130 may involve sliding the panel segments 130 into position and locking the panel segments 130 into the rest of the power supply 20 via an appropriate locking mechanism (e.g., screw, snap, detent built into the inner panel 132, etc.). Upon removal, the panel segments 130 may be replaced with other sets of removable panel segments, which may be configured to receive and hold cables of different sizes. As noted above, larger diameter cables 32 may be relatively longer than smaller diameter cables 32. Thus, removable panel segments of the power supply 20 may be designed such that smaller diameter clips do not take up the entire removable portion. That way, when larger diameter clips are desired, the larger diameter clips may span a larger portion of the same-sized removable panel to support the increased length.

Figure 9:
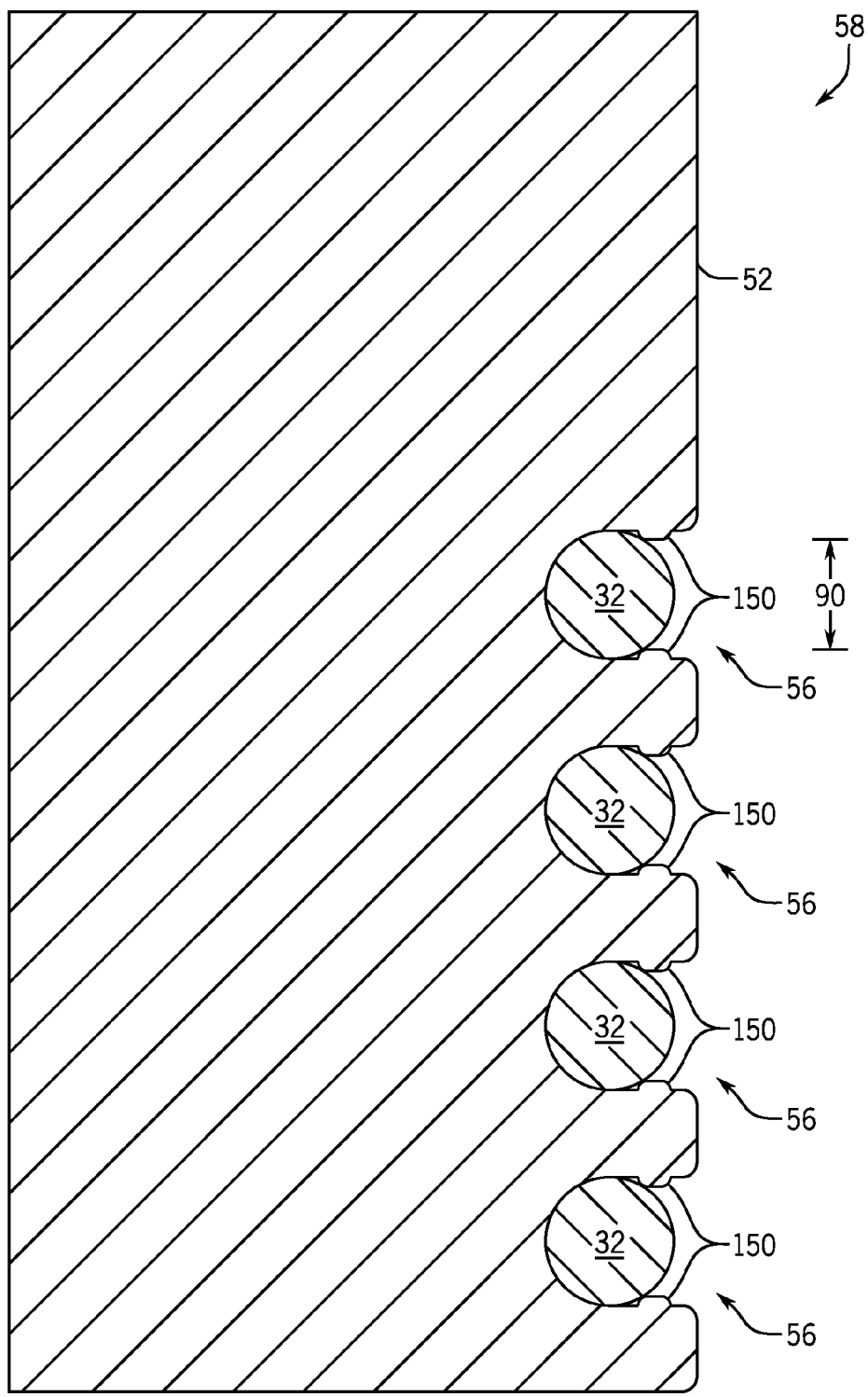
FIG. 9 is a cutaway view of an embodiment of the power supply of FIG. 5, showing clips for receiving the cable.

The grooves that form the clips 56 may take other shapes, including shapes that are only partially semi-circular. One such embodiment is illustrated in FIG. 9. In the illustrated embodiment, the clips 56 are semi-circular (or substantially semi-circular), and the clips 56 include protrusions, illustrated as two domed bumps 150 located toward the entrance of each clip 56. The protrusions extend into the respective groove of the clips 56, and the protrusions extend from flat portions of the clips 56 where the groove is no longer semi-circular. The flat portions of the clips 56 may be extensions of the semi-circular portions of the clips 56, defining the openings 90 of the clips 56. The illustrated domed bumps 150 (or other type of protrusion from the flat surfaces) help to maintain the cables 32 inside the clips 56 when the cables 32 are positioned therein. Similar to the embodiment of FIG. 6, the domed bumps 150 create a smaller opening 90 through which the cables 32 (with a larger diameter than the opening 90) are placed into the clips 56. Other clip shapes, besides semi-circular grooves with domed bumps, may be used to facilitate a smaller opening 90 through which the cables 32 are inserted into the clips 56. Such features may be made from flexible or non-flexible material to allow for the insertion of the cables 32.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power supply for use in a welding or cutting system, comprising:
    a housing configured to hold power conversion circuitry of the power supply, wherein the power conversion circuitry is configured to convert input power received from a power source to a desired output welding power,
    wherein the housing comprises a first panel and a second panel on a side of the housing opposite the first panel, wherein the first and second panels each comprises a plurality of substantially semi-circular grooves located at corners of the first and second panels,
    wherein each of the substantially semi-circular grooves is configured to receive a first cable when the first cable is wrapped around the housing, wherein a distal portion of the first cable comprises a strap for attaching the distal portion of the first cable to another portion of the first cable to secure the first cable relative to the power supply,
    wherein each of the substantially semi-circular grooves comprises protrusions extending into the respective substantially semi-circular groove at an entrance of the respective substantially semi-circular groove, a groove opening smaller than a first cable diameter of the first cable, and an interior surface that is rounded around a corner to provide a smooth transition for the first cable as the first cable wraps around the respective corner, and
    wherein each of the plurality of substantially semi-circular grooves further comprises a first semi-circular groove nested within a second semi-circular groove, wherein the first semi-circular groove has a first diameter, and wherein the second semi-circular groove has a second diameter that is larger than the first diameter.

2. The power supply of claim 1, wherein the plurality of substantially semi-circular grooves are molded into the corners of the first and second panels.

3. The power supply of claim 1, wherein the corners of the first and second panels are rounded to guide the first cable around the housing.

4. The power supply of claim 1, wherein the plurality of substantially semi-circular grooves are molded into the first panel and the second panel, wherein the first panel comprises a front panel of the housing and the second panel comprises a back panel of the housing.

5. The power supply of claim 1, wherein the plurality of substantially semi-circular grooves have a first diameter approximately equal to the first cable diameter of the first cable.

6. The power supply of claim 1, wherein the plurality of substantially semi-circular grooves have a diameter corresponding to a rated output amperage of the power supply.

7. The power supply of claim 1, wherein the plurality of substantially semi-circular grooves comprise flexible material to aid insertion and removal of the first cable in the plurality of substantially semi-circular grooves.

8. The power supply of claim 1, wherein the housing comprises an appropriate number of substantially semi-circular grooves for receiving a total length of the first cable.

9. The power supply of claim 1, comprising:
the first cable having a torch disposed at a first distal portion of the first cable; and
a second cable having a clamp disposed at a second distal portion of the second cable;
wherein the plurality of substantially semi-circular grooves are configured to receive the first and second cables as the first and second cables are wrapped around the power supply.

10. The power supply of claim 1, wherein the plurality of substantially semi-circular grooves have a first diameter that is smaller than the first cable diameter of the first cable in order to reduce slackening of the first cable once the first cable has been installed in the plurality of substantially semi-circular grooves.

11. A welding or cutting system, comprising:
a power supply comprising:
a housing comprising a first panel and a second panel on a side of the housing opposite the first panel, wherein the first and second panels each comprises a plurality of substantially semi-circular grooves located at corners of the first and second panels;
power conversion circuitry configured to convert input power received from a power source to a desired output welding power; and
a first cable assembly having a torch disposed at a first distal portion of a first cable, wherein the first distal portion of the first cable comprises a strap for attaching the first distal portion of the first cable to another portion of the first cable to secure the torch relative to the power supply;
wherein each of the substantially semi-circular grooves is configured to receive and hold the first cable when the first cable is wrapped around the housing, wherein each of the substantially semi-circular grooves comprises a groove opening smaller than a first cable diameter of the first cable, and an interior surface that is rounded around a corner to provide a smooth transition for the first cable as the first cable wraps around the respective corner,
wherein each of the substantially semi-circular grooves comprises protrusions extending into the respective substantially semi-circular groove at an entrance of the respective substantially semi-circular groove such that the respective substantially semi-circular groove is configured to receive and hold the first cable when the first cable is wrapped around the housing, and
wherein each of the plurality of substantially semi-circular grooves further comprises a first semi-circular groove nested within a second semi-circular groove, wherein the first semi-circular groove has a first diameter, and wherein the second semi-circular groove has a second diameter that is larger than the first diameter.

12. The system of claim 11, wherein each of the substantially semi-circular grooves comprises protrusions extending into the respective substantially semi-circular groove at an entrance of the respective substantially semi-circular groove such that the respective substantially semi-circular groove is configured to receive and hold the first cable when the first cable is wrapped around the housing.

13. A front panel of a welding power supply comprising:
a plurality of substantially semi-circular grooves located at first and second corners of the front panel, wherein each of the substantially semi-circular grooves is configured to receive a first cable when the first cable is wrapped around the front panel, wherein the first cable comprises a strap configured to attach a first distal portion of the first cable to another portion of the first cable to secure the cable,
wherein each of the substantially semi-circular grooves comprises a groove opening smaller than a first cable diameter of the first cable, and an interior surface that is rounded around the first corner or the second corner to provide a smooth transition for the first cable as the first cable wraps around the first corner or the second corner,
wherein each of the substantially semi-circular grooves comprises protrusions extending into the respective substantially semi-circular groove at an entrance of the respective substantially semi-circular groove such that the respective substantially semi-circular groove is configured to receive and hold a first cable when the first cable is wrapped around the front panel, and
wherein each of the plurality of substantially semi-circular grooves further comprises a first semi-circular groove nested within a second semi-circular groove, wherein the first semi-circular groove has a first diameter, and wherein the second semi-circular groove has a second diameter that is larger than the first diameter.

14. The front panel of claim 13, wherein the plurality of substantially semi-circular grooves are molded into the first and second corners of the front panel.

15. The front panel of claim 13, wherein the plurality of substantially semi-circular grooves are molded into a detachable panel, wherein the detachable panel is removably attached to the front panel, and wherein the detachable panel is secured to the front panel with a locking mechanism.

16. The front panel of claim 13, wherein the plurality of substantially semicircular grooves located at the first corner are molded into a first detachable panel, wherein the plurality of substantially semi-circular grooves located at the second corner are molded into a second detachable panel, wherein the first and second detachable panels are removably attached to the front panel, wherein the first and second detachable panels are secured to the front panel with a locking mechanism, wherein each of the plurality of substantially semi-circular grooves at the first corner has a first diameter, and wherein each of the plurality of substantially semi-circular grooves at the second corner has a second diameter that is different from the first diameter.

\* \* \* \* \*